United States Patent
Alcendor

(10) Patent No.: US 12,540,309 B2
(45) Date of Patent: Feb. 3, 2026

(54) METHODS OF ISOLATING CELLS FROM PLACENTAL TISSUE

(71) Applicant: Meharry Medical College, Nashville, TN (US)

(72) Inventor: Donald J. Alcendor, Hermitage, TN (US)

(73) Assignee: Meharry Medical College, Nashville, TN (US)

( * ) Notice: Subject to any disclaimer, the term of this patent is extended or adjusted under 35 U.S.C. 154(b) by 244 days.

(21) Appl. No.: 17/031,611

(22) Filed: Sep. 24, 2020

(65) Prior Publication Data

US 2021/0123015 A1    Apr. 29, 2021

Related U.S. Application Data

(60) Provisional application No. 62/904,997, filed on Sep. 24, 2019.

(51) Int. Cl.
*C12N 5/073* (2010.01)

(52) U.S. Cl.
CPC .... *C12N 5/0605* (2013.01); *C12Y 304/21004* (2013.01)

(58) Field of Classification Search
CPC ............... C12N 5/0605; C12N 5/0634; C12N 2523/00; C12N 2529/10; C12N 2527/00; C12Y 304/21004; B01L 2300/0832; B01L 2200/0668; B01L 2200/0689; B01L 2300/165; B01L 3/0275; A61K 9/0019; A61K 40/10; A61K 40/22; A61K 40/416; A61K 40/418; A61K 2239/31; A61K 2239/38; A61K 35/15; A61K 35/17; A61P 19/02; A61P 19/08
See application file for complete search history.

(56) References Cited

U.S. PATENT DOCUMENTS

| | | |
|---|---|---|
| 6,455,325 B1 | 9/2002 | Hideji |
| 2007/0224588 A1* | 9/2007 | Pircher .................... A01N 1/10 435/287.1 |

FOREIGN PATENT DOCUMENTS

DE      102005015832 A1 *  11/2006   ........... A61K 39/395

OTHER PUBLICATIONS

Koiokoltsova et al. "Isolation and characterization of trophoblasts from enzymatic explants of human term placenta" Human Cell (2017) 30: 249-257. (Year: 2017).*
Instructions Bel-Art SP Scienceware Cloning Cylinders Sterile (Year: 2016).*
SP Bel-Art Sterile Cloning Cylinders Catalog (Year: 2024).*
Tu'uhevaha J Kaitu'u-Lino "Systematic Development of a Primary Trophoblast Isolation Protocol" Reproductive Sciences, vol. 21, No. 3 (Supplement), Mar. 2014 (Year: 2014).*

(Continued)

*Primary Examiner* — Tracy Vivlemore
*Assistant Examiner* — Lauren K Van Buren
(74) *Attorney, Agent, or Firm* — Bradley Arant Boult Cummings LLP; Phil Walker; Jessica L. Zurlo

(57) ABSTRACT

Methods for isolating a population of cells from tissue are disclosed herein. In particular, the present disclosure provides methods for isolating cytotrophoblasts from placental tissue. The methods include isolating a population of cells with the use of a laboratory apparatus that is coated with a lubricant, such as petroleum jelly. The methods described herein achieve consistent in vitro isolation of purified cells.

15 Claims, 11 Drawing Sheets

(56) References Cited

OTHER PUBLICATIONS

United States Patent Office, International Search Report for International Application No. PCT/US20/52585, Feb. 4, 2021.
Unites States Patent Office, Written Opinion of the International Searching Authority for International Application No. PCT/US20/52585, Feb. 4, 2021.
Mazzoletti et al., In Vivo Target Validation by Inducible RNAi in Human Xenograft Mouse Models, in in Target Identification and Validation in Drug Discovery: Methods and Protocols, 325, 325-337 (Jurgen Moll & Ricardo Colombo eds., 2013).
Kolokol'tsova, T.D., et al., Characteristics of Trophoblasts in Long-Term Culture, Cell Technologies in Biology and Medicine, No. 3, Dec. 2017, pp. 259-265.
Campbell, S., et al., Chorionic Villus Sampling as a Source of Trophoblasts, ScienceDirect, Jul. 2007, pp. 1118-1122.
Alphonse, Rajesh S., et al., The Isolation and Culture of Endothelial Colony-Forming Cells from Human and Rat ungs, Nature America, Inc., 2015, pp. 1697-1709.
Serjilus, Ashley, et al., Unique Method for Human Villous Trophoblasts Isolation from Placental Tissue Explants, Clin Obstet Gynecol Reprod Med., Dec. 2020, 6(6), pp. 1-16.
Extended European Search Report dated Sep. 7, 2023 of European Patent Application No. 20869388.7.

\* cited by examiner

METHODS OF ISOLATING CELLS FROM PLACENTAL TISSUE

CROSS-REFERENCE TO RELATED APPLICATION

This application claims the benefit of U.S. Provisional Patent Application No. 62/904,997, filed Sep. 24, 2019, which is incorporated by reference herein in its entirety.

STATEMENT REGARDING FEDERALLY SPONSORED RESEARCH OR DEVELOPMENT

This invention was made with government support under grant number S21MD000104 awarded by the National Institutes of Health (NIH). The government has certain rights in the invention.

In this context "government" refers to the government of the United States of America.

FIELD OF THE DISCLOSURE

The present disclosure relates generally to methods for isolating a population of cells from tissue, and more specifically, to methods for isolating trophoblasts from placental tissue.

BACKGROUND OF THE DISCLOSURE

The placenta is a fetal organ that is responsible for nutrient and gas exchange between the mother and baby throughout pregnancy. Abnormal placentation can cause various pregnancy complications (such as miscarriage, preeclampsia and intrauterine growth restriction), which increase the risk for the development of severe disorders in later life such as cardiovascular disease and type 2 diabetes. For this reason, it is important to understand the molecular mechanism governing human placental formation and trophoblast cell lineage.

There are a number of conventional cell culture techniques that use different types of placenta-derived cells to understand placenta biology. However, these techniques lack organ-specific ultrastructure and physiological function of the placenta. Modeling of the human placenta to better understand placenta biology in human development has culminated into the establishment of placenta-on-a-chip models based on the compartmentalization of primary human placenta cells in vitro that can be monitored in real time (Mittal R, et al. *J Cell Physiol.* 2019; 234(6):8352-8380; Lee J S et al. *J Matern Fetal Neonatal Med.* 2016; 29(7):1046-54; Yin F et al. *Toxicol In Vitro.* 2019; 54:105-113; Blundell C et al. *Adv Healthc Mater.* 2018; 7(2)). These microdevices are created by using microfluidics, microfabrication technologies, and microsystems that include two polydimethylsiloxane (PDMS) microfluidic channels separated by a thin extracellular matrix (ECM) membrane (Lee J S et al. *J Matern Fetal Neonatal Med.* 2016; 29(7):1046-54). Essential cellular components of these model placenta microsystems are placental trophoblasts.

The widespread use of commercially available trophoblast cell lines, such as BeWo, JEG-3, or JAR, that are derived from human choriocarcinoma, have been useful. However, these transformed cell lines, some of which have been in culture for decades, do not mimic primary trophoblasts in vivo (Pattillo R A et al. *Cancer Res.* 28: 1231-1236, 1968; Pattillo R A et al. *Ann. N.Y. Acad. Sci.* 172: 288-298, 1971; Kohler P O et al. *J. Clin. Endocrinol.* 32: 683-687, 1971; Pattillo R A et al. *In Vitro* 6: 398-399, 1971). The task of having to isolate primary cytotrophoblasts from placental tissue may be labor-intensive and require expensive reagents with variable results. Routine villous trophoblast isolation based on trypsin digestion of placental villi, followed by additional purification steps, may be costly and labor-intensive (Kliman H J et al. *Endocrinology* 1986; 118:1567e82). Purification of villous trophoblasts using Percoll gradients was shown to yield a purity of about 80% by Kilman et al. (*Endocrinology* 1986; 118:1567e82; Clabault H et al. *Methods Mol Biol.* 2018; 1710:219-231). Magnetic beads also have been used to further purify villous trophoblasts from trypsin-treated placental explants (Douglas G C et al. *J Immunol Methods* 1989; 119:259e68; Petroff M G et al. *Methods Mol Med.* 2006; 121:203-217). Other groups have demonstrated the separation of cytotrophoblasts from mononucleated syncytial fragments (Huppertz B et al. *Lab Invest* 1999; 79:1687e702; Guilbert L J et al. *Placenta* 2002; 23:175e83; Tannetta D S et al. *Placenta* 2008; 29:680e90). However, these procedures still require second-line separation technologies to achieve reasonable purity from other contaminating placental cell types.

Accordingly, there remains a need in the art for a more streamlined, efficient method for achieving consistent in vitro isolation of cells, such as cytotrophoblasts, from placental tissue.

SUMMARY

The problems expounded above, as well as others, are addressed by the following inventions, although it is to be understood that not every embodiment of the inventions described herein will address each of the problems described above. In some embodiments, it has been unexpectedly discovered that the methods described herein achieve consistent in vitro isolation of cells, such as cytotrophoblasts, from placental tissue.

In a first aspect, a laboratory apparatus for isolating a cell is provided, the laboratory apparatus including a hollow structure having a first open end and a second open end, wherein the first open end is coated with a lubricant and the first open end is configured for placement over the cell.

In a second aspect, a method for isolating a trophoblast cell is provided, the method including harvesting placental villous tissue from a detached normal placenta; culturing the placental villous tissue in a culture medium under conditions suitable for proliferation of trophoblasts; and isolating a trophoblast cell using the laboratory apparatus described above to form an isolated trophoblast cell.

In a third aspect, a method for isolating trophoblast cells from placental tissue, including obtaining a detached normal placenta; collecting placental cotyledons from the detached normal placenta; harvesting placental villous tissue from the placental cotyledons; culturing the placental villous tissue in a culture medium; placing the first open end of the laboratory apparatus described above over a colony of trophoblast cells to form an isolated colony; and treating the isolated colony of trophoblast cells with an enzyme solution.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

Further features and advantages of the present disclosure can be ascertained from the following detailed description that is provided in connection with the drawings described below.

Figure 1:
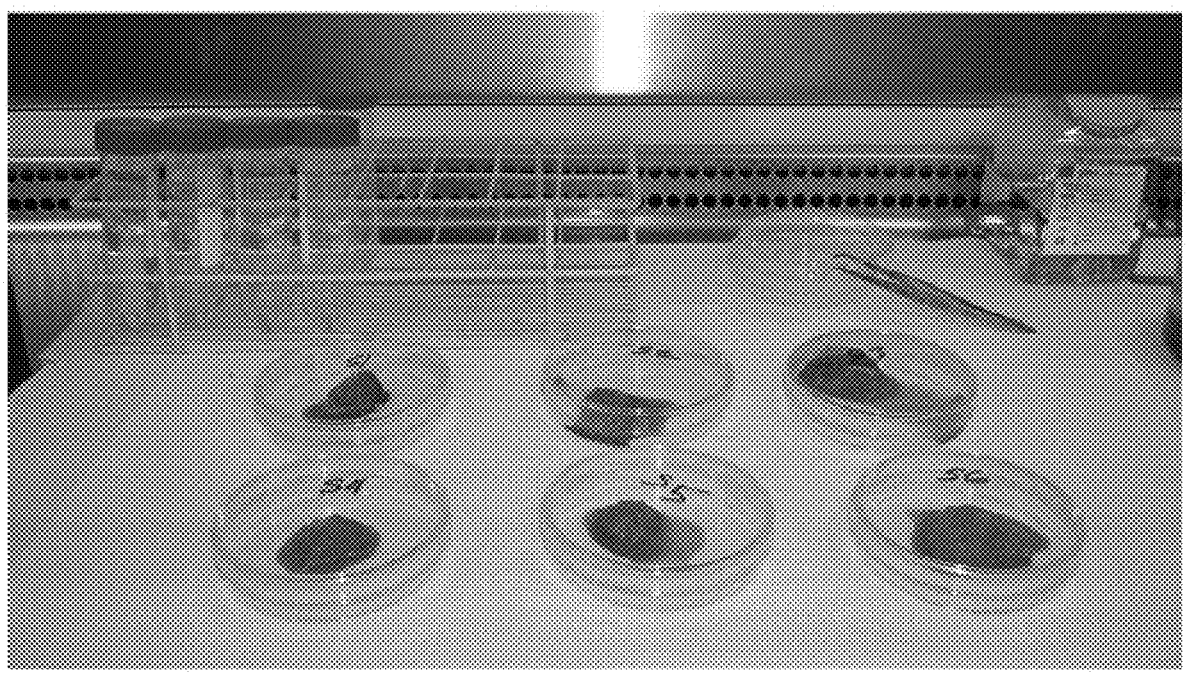
FIG. 1 shows the cultivated placenta explants utilized for cytotrophoblast isolation.

The drawings are not to scale and intended to depict only typical aspects of the invention, and therefore should not be considered as limiting the scope of the disclosure.

DETAILED DESCRIPTION

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular embodiments only and is not intended to be limiting. As used herein, the singular forms "a," "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. For biological systems, the term "about" refers to an acceptable standard deviation of error, preferably not more than 2-fold of a given value.

In the following discussion certain outside documents are referenced to enable the reader to make and use the subject matter described herein. Nothing contained herein is to be construed as an "admission" of prior art. Applicant expressly reserves the right to demonstrate, where appropriate, that such documents referenced herein do not constitute prior art under the applicable statutory provisions.

B. Methods of Isolating

The present disclosure provides methods for isolating a population of cells from tissue. In some embodiments, the present disclosure provides methods for isolating cytotrophoblasts from placental tissue. That is, the methods disclosed herein, in some embodiments, allow for routine cultivation and purification of villous trophoblasts from placental tissue explants. The methods described herein unexpectedly achieve consistent in vitro isolation of purified cells.

In one embodiment, the method of the present disclosure utilizes placental tissue to isolate trophoblasts, such as cytotrophoblasts. As used herein, the term "trophoblast" refers to an epithelial cell that is derived from the placenta of a mammalian embryo or fetus. A trophoblast typically contacts the uterine wall. There are three types of trophoblast cells in the placental tissue: the villous cytotrophoblast, the syncytiotrophoblast, and the extravillous trophoblast, and as such, the term "trophoblast" as used herein encompasses any of these cells. The villous cytotrophoblast cells are specialized placental epithelial cells which differentiate, proliferate, and invade the uterine wall to form the villi. Cytotrophoblasts, which are present in anchoring villi can fuse to form the syncytiotrophoblast layer or form columns of extravillous trophoblasts.

In this aspect, the method involves obtaining a detached normal placenta. As used herein, "detached normal placenta" refers to a placenta separated from the body of a healthy woman after birth. By using a detached normal placenta, the methods of the present disclosure dispense of the need to perform an invasive aparoscopic surgery during pregnancy. The detached normal placenta should be promptly stored under sterile conditions.

In some embodiments, the method of the present disclosure cultivates villous trophoblasts from placental cotyledons. As used herein, "placental cotyledons" refer to round structures within the placenta that contain chorionic villi. In this aspect, the method includes collecting placental cotyledons from the detached normal placenta. The collection of the placental cotyledons may be performed by any conventional anatomical method known in the art. In one embodiment, the placental cotyledons may be excised from the detached normal placenta using any known surgical instruments, such as a scalpel and/or surgical scissors. In one embodiment, after the placental cotyledons have ben excised from the detached normal placenta, the placental cotyledons may be stored on ice for further use.

In one embodiment, placental villous tissue is harvested from the placental cotyledons. Prior to harvesting, the placental cotyledons may be washed with a solution, such as phosphate buffered saline (PBS) or an antibiotic-containing PBS (for example, penicillin- or streptomycin-containing PBS). The placental cotyledons may be washed twice or more, for example, the placental cotyledons may be washed three times. The washing step can remove contaminants, such as blood, and provide hydration for the tissue. The harvesting of the placental villous tissue may be performed by any conventional anatomical method known in the art. In one embodiment, the decidual layer may be removed to expose placental villous tissue. The placental villous tissue can then be harvested by mincing the placental cotyledons using any known surgical instruments, such as a scalpel and/or surgical scissors. The placental villous tissue explants may be sectioned and placed in a sterile container, such as a petri dish. As used herein, "explant" refers to a sample obtained from any part of an organism.

Once the placental villous tissue explants are sectioned and placed into a container (such as a petri dish or plate), a culture medium, such as a trophoblast medium, can be added to each container. In some embodiments, the culture medium is a fetal bovine serum (FBS) and antibiotic-containing medium. For instance, the culture medium may include 10 percent FBS and 1 percent of an antibiotic, such as penicillin-streptomycin. In one embodiment, the culture media is added to the tissue explants in an amount of about 5 mL to about 30 mL. In another embodiment, the culture media is added to the tissue explants in an amount of about 10 mL to about 20 mL. In still another embodiment, the culture media is added to the tissue explants in an amount of about 10 mL.

In some embodiments, the method of the present disclosure includes incubating the cultures of placental villous tissue explants to promote trophoblast explant outgrowth. The cultures may be incubated for about 1 day to about 20 days. In another embodiment, the cultures may be incubated for about 1 day to about 16 days. In still another embodiment, the cultures may be incubated for about 3 days to about 10 days. In yet another embodiment, the cultures are incubated for about 16 days. In some embodiments, the cultures are incubated under conventional culture conditions. For instance, the cultures may be incubated at a temperature of about 37° C. Additionally, the culture medium may be replaced with fresh media throughout the incubation period. In some embodiments, the media may be replaced with fresh media every 5 days, preferably every 3 days, and more preferably every 2 days.

In one embodiment, the trophoblast explant outgrowth is examined during the period of incubation for distinct colonies of trophoblasts. In this aspect, the trophoblast explant outgrowth may be examined every three days, preferably every other day, and more preferably on a daily basis. For example, the trophoblast explant outgrowths may be examined by microscopy. In some embodiments, colonies of trophoblast outgrowth may be identified by morphology. For instance, the colonies having morphological characteristics and growth rates consistent with trophoblast monolayers may be identified. Once the colonies of trophoblast outgrowth are identified, the colonies may be marked for isolation.

In some embodiments, the method includes isolating trophoblasts, such as cytotrophoblasts, from any of the identified explant outgrowths. Prior to extraction of a colony of trophoblasts, any culture media present in the container (for example, the petri dish or plate) may be removed. Once the culture media is removed, a colony of trophoblasts may be isolated. In some embodiments, the colony of trophoblasts may be isolated by using a laboratory apparatus having a hollow structure. The laboratory apparatus may include any hollow structure having a first open end and a second open end. In one embodiment, a modified version of a standard pipette may be used to isolate a colony of trophoblasts. In this aspect, the tip and bulb portion of a standard pipette may be removed to expose the barrel portion of the pipette. Any standard pipette may be utilized so long as the tip and bulb portion can be removed to expose the barrel of the pipette. The size of the pipette may vary depending on the size of the trophoblast population that is to be isolated. In some embodiments, the present method utilizes a standard 1 mL pipette. In another embodiment, a standard cloning cylinder may be used so long as the structure has at least two open ends. Any suitable cylinder that can be sterilized may be utilized (e.g., those constructed of a polymer, glass, or a metal). In some embodiments, the present method utilizes antigen-specific antibodies on magnetic beads and isolation after subculture of trophoblasts is confirmed in chamber slides by indirect immunofluorescence staining.

Prior to isolation, one end of the laboratory apparatus, for instance, one end of the exposed barrel portion of the pipette or one end of the cloning cylinder, may be coated with a lubricant to help seal the edge of the hollow structure during isolation. Suitable lubricants include, but are not limited to, petroleum jelly, mineral oil, grease, polyalpha-olefins (PAO), synthetic esters, polyalkylene glycols (PAG), and combinations thereof. A hydrophobic marker may be used for isolation, such an IMMEDGE hydrophobic barrier pen, can be used. In one embodiment, one end of the laboratory apparatus may be coated with petroleum jelly. In other embodiments, one end of the laboratory apparatus may be coated with mineral oil. In still another embodiment, one end of the laboratory apparatus may be coated with grease. The coated end of the laboratory apparatus may then be placed directly over the trophoblast colony that is to be isolated. Advantageously, coating the end of the laboratory apparatus with a lubricant, such as petroleum jelly, helps seal the edge of the structure for focal trypsinization and prevents cross-contamination by floating cells or cells from distal colonies. Hydrophobic marking pens can also be used to create a seal around a selected colony for extraction with trypsin.

After isolating the selected trophoblast population, the selected population may be treated with an enzyme. In one embodiment, the selected trophoblast population may be treated with a solution of trypsin. For instance, the selected trophoblast population may be treated with a solution of 0.05 percent trypsin-EDTA. In some embodiments, the enzyme solution may be added to the trophoblast population directly through the exposed end (e.g., the second open end) of the laboratory apparatus while it is placed over the trophoblast colony. In other embodiments, the enzyme solution may be added to the trophoblast population after the population has been extracted.

In some embodiments, a population of isolated cells is formed. As used herein, the term "population of isolated cells" means a population of cells that is substantially separated from other cells of the tissue from which the population of cells is derived (for example, the placenta). In one embodiment, a population of isolated cytotrophoblast cells is formed. The isolated cytotrophoblasts may then be sub-cultured and validated for identity and purity. In some embodiments, the isolated cytotrophoblasts may be validated by measuring the expression of trophoblast marker molecules, such as cytokeratin7, hCG, HLA-G, placental alkaline phosphatase, and hyaluronic acid targeted by monoclonal antibody NDOG1. In a preferred embodiment, the isolated cytotrophoblasts may be validated by immunofluorescent staining with the epithelial intermediate filament antigenic biomarker, cytokeratin 7. The isolated cytotrophoblasts may be validated by measuring the expression of a mesenchymal marker, such as vimentin.

In some embodiments, identification or purity of the isolated cytotrophoblasts may be validated by measuring hCG expression in the isolated cytotrophoblasts after treatment with forskolin.

While the methods of the present disclosure have been described herein for the isolation of cytotrophoblasts from placental tissue, one of ordinary skill in the art would understand that the described methods may be modified for selective isolation of cell populations from a variety of different tissues in multiple organ systems. For instance, the disclosed methods may be modified for isolating any of the following cell populations: stem cells (embryonic and adult), fibroblasts, chondrocytes, osteoblasts, osteoclasts, osteocytes, Merkel cells, and Langerhans cells, mesangial cells, podocytes, hepatocytes, pericytes, endothelial cells, cardiomyocytes, stellate cells, epithelial cells, astrocytes, ocular cells, adipose cells, pulmonary cells, microglial cells, adrenal cortical cells, smooth muscle cells, macrophages, urothelial cells, keratinocytes, melanocytes, Sertoli cells, liver stellate cells, kidney cells, heart cells, other visceral organ cells, and tumor cells.

As described herein, the disclosed methods have a number of advantages, for instance, selective isolation of cytotrophoblasts. In some embodiments, the populations of cells isolated by the methods disclosed herein may be employed in in vitro placenta-on-a chip models to investigate placental cell biology and function, as well as physiological responses after exposure to toxicants and infectious agents. In other embodiments, the populations of cells isolated by the disclosed methods may facilitate in vitro studies of trophoblast proliferation, differentiation, invasion, virus interactions, cytokinesis, immunology, cellular differentiation, cellular transformation, cell division, apoptosis, and cellular transplantation. In yet other embodiments, the populations of cells isolated by the disclosed methods may facilitate: development of microfluidic placenta models, development of a source of progenitor cells for differentiation, cultivation of purified cell populations for therapeutics, development of organs on a chip technologies, and development of purified cell infusions.

C. Example

Example 1: Isolation of Purified Villous Cytotrophoblasts from Placental Explants The following is an exemplary method for isolating cytotrophoblasts from human placenta villous explants.

Materials and Methods

Placenta Collection

Placentas were obtained from elective non-laboring caesarean sections after uncomplicated full-term pregnancies at Vanderbilt University Medical Center. These studies were approved by the Vanderbilt University Institutional Review Board.

Explant Cultivation

Nodes were collected from intact placentas under sterile conditions. Villous nodes were first submerged in complete trophoblast media and transported on ice. Before dissection, nodes were washed in an excess of PBS to reduce erythrocyte contamination and hydrate the tissue. Villous nodes were sectioned with a scalpel and surgical scissors and placed in dishes.

FIG. 1 shows the cultivated placenta explants utilized for cytotrophoblast isolation. The villous nodes/cotyledons shown in FIG. 1 were excised from placentas with a scalpel and surgical scissors in a laminar flow hood and transported on ice in 50 mL conical tubes containing 30 mL trophoblast media. The nodes were soaked in PBS (pH 7.4) prior to dissection and cultivation.

Cytotrophoblast Isolation

All procedures involved in the collection of placentas and placental explants and their transport were performed under sterile conditions. The time from delivery to placental node isolation did not exceed 1 hour.

Figure 2:
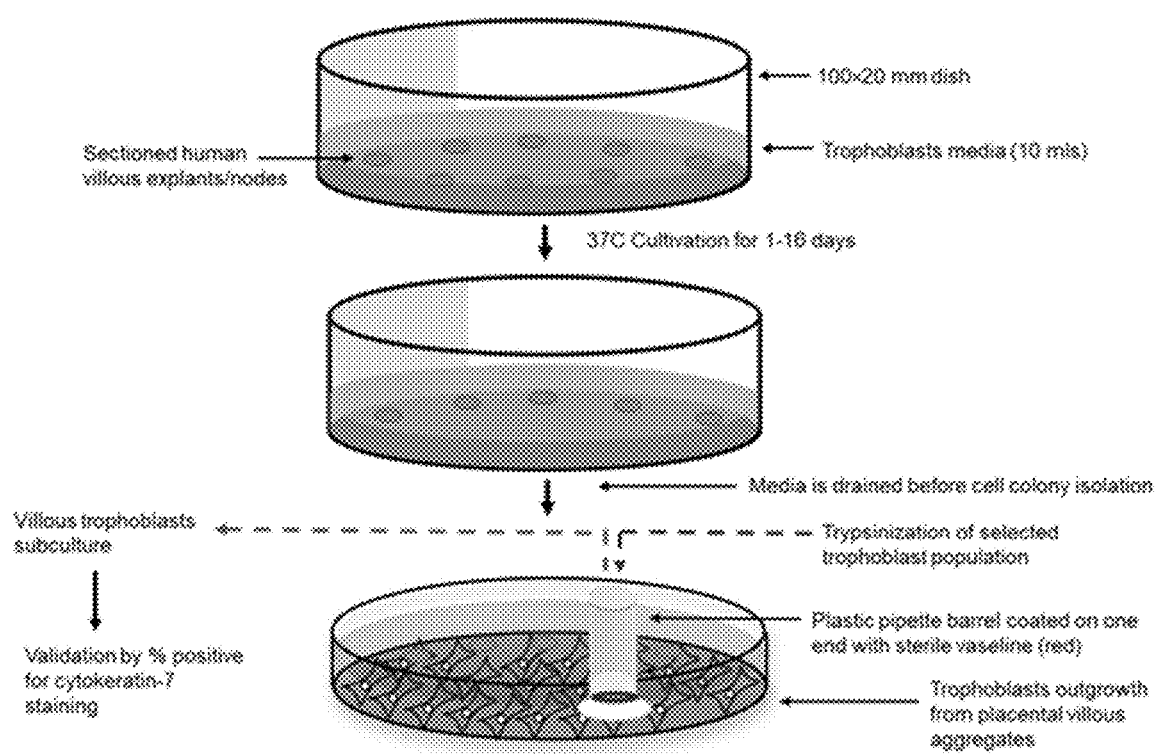
FIG. 2 is a schematic diagram showing the method for isolating cytotrophoblasts from placental explants. The isolation of cytotrophoblasts involves sectioning and placement of villous explants on a petri dish and cultivation and isolation of selected cell colonies from outgrowth from villous aggregates using a simple pipette barrel coated with VASELINE petroleum jelly, followed by trypsinization and subculture to access purity by cytokeratin 7 staining.

FIG. 2 is a schematic diagram showing the method for isolating cytotrophoblasts from placental explants. For isolation of cytotrophoblasts, placental nodes or cotyledons were washed three times with phosphate buffered saline (PBS) pH 7.4 and excised with sterile surgical scissors. The decidual layer was removed to expose villous tissue. Placental nodes/cotyledons were minced with a number 21 scalpel, and individual 5-mm tissue explants were spatially added to 100×20-mm dishes and cultured in 10 mL of trophoblast medium per plate (10% fetal bovine serum, 1% penicillin/streptomycin; ScienCell, Carlsbad, CA) (Aronoff D M et al. *Am J Reprod Immunol.* 2017 September; 78(3): 10.1111/aji.12728). Explant cultures were incubated at 37° C. for 1-16 days, with fresh media changes every 2 days. Trophoblast medium was supplemented with 25 µg/mL of Fungizone (Gibco, Life Technologies, Grand Island, NY).

Trophoblast explant outgrowth was examined daily by microscopy. Trophoblast colonies were identified using an inverted microscope. Distinct colonies were identified by morphology and encircled using a felt tip marker prior to extraction. Colony extraction was accomplished using the barrel of a plastic, sterile 1-mL pipette tip after the tip was removed with the scalpel. Media was removed from the dish, the open barrel of the pipette tip was dipped in sterile VASELINE petroleum jelly, and the end of the pipette barrel containing VASELINE petroleum jelly was placed directly over the trophoblast colony on the plate. The VASELINE petroleum jelly created a seal around the cell colony. Selected colonies were first identified during early stages of colony formation, as shown by FIG. 4B. The methods of isolation may not include tissue homogenization, as tissue homogenization may increase the risk the likelihood of endothelial cell contamination. Trypsin was added (0.05% trypsin/EDTA (Gibco, Life Technologies, Grand Island, NY)) to the open end of the pipette barrel for 10 min at 37° C. Trypsinized cytotrophoblasts were added to 4-well chamber slides containing trophoblast medium. Confluent cells were confirmed as trophoblasts by staining with the epithelial intermediate filament antigenic biomarker cytokeratin 7 (Millipore, Bedford, MA). Several colonies were selected using the trypsin-pipette-petroleum jelly method of isolation, as described above.

Cells and Viruses

The HCMV-GFP recombinant virus expressing green fluorescent protein was obtained. HCMV-GFP was cultivated in human foreskin fibroblasts at a multiplicity of infection (moi) of 01. Viral titers were determined by limiting dilution using a fluorescent focus assay (Alcendor D J et al. *J Neuroinflammation* 2012 May 18; 9:95). All infections with the SBCMV clinical strain were performed at passage level 3 (Alcendor D J et al. *J Neuroinflammation* 2012 May 18; 9:95; Wilkerson I et al. *J Neuroinflammation.* 2015 Jan. 9; 12:2).

HCMV-GFP Infection of Placental Histocultures

Villous trophoblasts are highly permissive for HCMV lytic replication. To determine if there were viable cells that could support replication of HCMV, histocultures of villous nodes were infected with a recombinant HCMV-GFP. Approximately 20 grams of minced villous tissue were added to 30 mL of trophoblast media in a 50-ml conical tube pre-warmed to 37° C. The HCMV-GFP recombinant virus at a moi 0.1 was used to infect trophoblasts histocultures and was incubated for 1 hour at 37° C. (Aronoff D M et al. *Am J Reprod Immunol.* 2017 September; 78(3): 10.1111/aji.12728). After 1-hour post-infection the media was removed, and fresh media was added. The histocultures were then incubated at 37° C. for 96 hours. Infected villous tissue was placed in chamber slides and examined by fluorescent microscopy for GFP expression.

Immunofluorescence

Chamber slide cultures containing subcultured trophoblasts were washed twice with PBS (pH 7.4), air-dried, and fixed at −20° C. in absolute methanol for 10 minutes. Cells were air-dried for 15 minutes, hydrated in Tris-buffered saline (pH 7.4) for 5 minutes, and incubated separately for 1 hour with mouse monoclonal antibodies against cytokeratin 7, (Santa Cruz Biotechnology, Dallas TX), diluted 1:50 in PBS (pH 7.4). Cells were washed three times with Tris saline and then incubated at 37° C. for 30 minutes with a combination of secondary donkey anti-mouse Immunoglobulin G (IgG) antibodies, conjugated with fluorescein isothiocyanate (FITC) (Jackson ImmunoResearch, West Grove, PA) at a 1:100 dilution in PBS (Alcendor D J et al. *J Neuroinflammation* 2012 May 18; 9:95; Wilkerson I et al. *J Neuroinflammation.* 2015 Jan. 9; 12:2). Cells were washed another three times in Tris saline and mounted with Vectashield mounting media (Vector Laboratories, Burlingame, CA) containing 1.5 µg/mL of 4',6-diamidino-2-phenylindole (DAPI). Fluorescence was photographed with a Nikon TE 2000 S fluorescent microscope mounted with a charge-coupled device (CCD) camera (Nikon, Tokyo, Japan).

Immunohistochemistry

Primary trophoblasts were cultivated in chamber slides at a density of $1\times10^4$ cells/well in trophoblasts media with and without forskolin for 72 hours. Cells were wash 3× with PBS pH 7.4, air dried at room temperature, and fixed in 100% methanol at −20 C for 30 minutes. Cells were then air dried, hydrated in PBS, and immunohistochemistry (IHC) was performed as previously described using a mouse monoclonal antibody to human chorionic gonadotropin (hCG). DAB (3, 3-diaminobenzidine) was used as a peroxidase substrate for color development. Positive trophoblasts appear brown in color.

Forskalin Treatment

Primary trophoblasts were cultivated in chamber slides at a density of $1\times10^4$ cells/well in trophoblasts media and treated with 25 µM of forskolin (Sigma-Aldrich Inc.) for 72 hours. Mock treated cells were given media only.

Results

Explant Cultivation

Nodes are collected from intact placentas under sterile conditions. Villous nodes were first submerged in complete trophoblast media and transported on ice. Before dissection, nodes were washed in an excess of PBS to reduce erythrocyte contamination and hydrate the tissue (FIG. 1). Villous nodes are sectioned with a scalpel and surgical scissors and placed in dishes. Fresh, prewarmed trophoblast media was added, and explant cultures were incubated at 37 C for 1-16 days, with fresh media changes every 2 days.

Placental Histocultures Support HCMV-GFP Replication

Figure 3A:
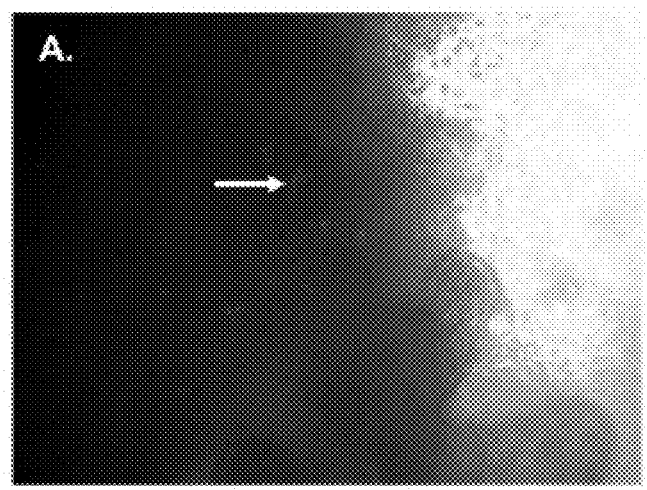
FIG. 3A shows fluorescent microscopy of viable cells infected with HCMV-GFP expressing green fluorescent protein in peripheral placental tissue as shown by the white arrow.
Figure 3B:
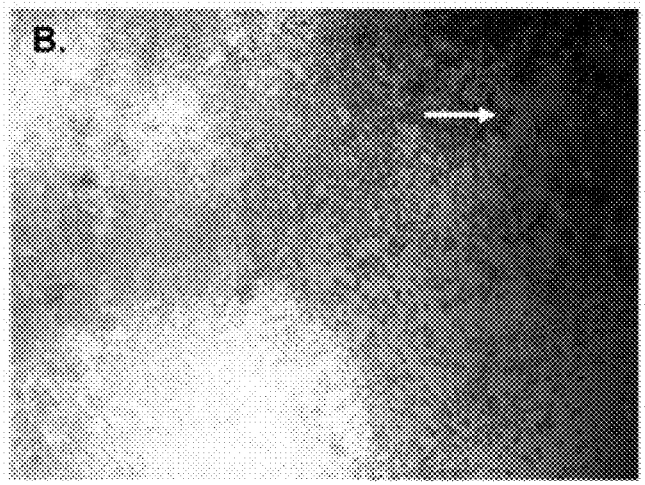
FIG. 3B shows fluorescent microscopy of viable cells infected with HCMV-GFP expressing green fluorescent protein in peripheral placental tissue and contamination with erythrocytes as shown by the white arrow.
Figure 3C:
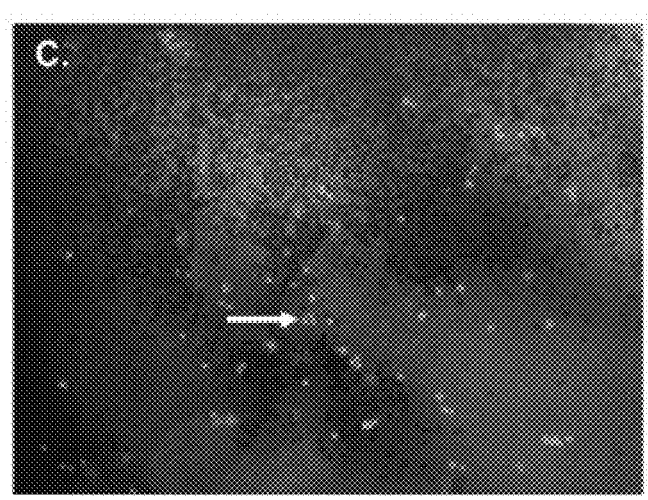
FIG. 3C shows fluorescent microscopy of viable cells infected with HCMV-GFP expressing green fluorescent protein in aggregate tissue and contamination with erythrocytes as shown by the white arrow.
Figure 3D:
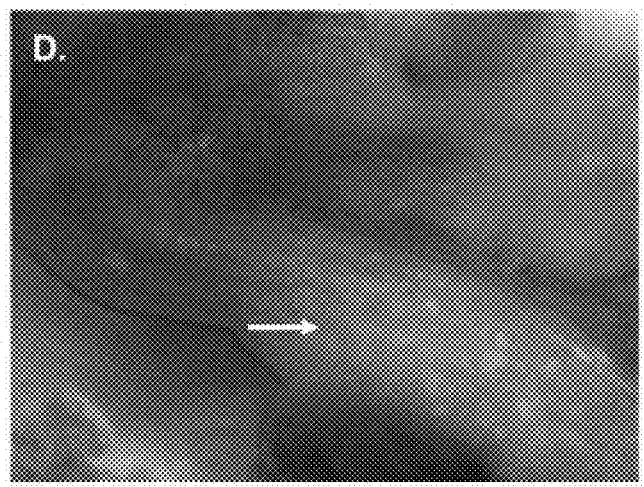
FIG. 3D shows fluorescent microscopy of viable cells in villous tree structures infected HCMV-GFP expressing green fluorescent protein as shown by the white arrow. All images were obtained using a Nikon TE2000S microscope mounted with a charge-coupled device (CCD) camera at ×200 magnification.

FIGS. 3A-3D show placental explant histocultures infected with HCMV-GFP. As described above, placental explant histocultures were infected with HCMV-GFP and examined for GFP fluorescence 96 hours post-infection. At 96 hours post-infection, GFP-positive cells were observed by fluorescent microscopy in peripheral tissue and isolated cells (FIGS. 3A, 3B, and 3C), and internal villous tree structures (FIG. 3D). A significant amount of erythrocyte contamination was also observed in all specimens examined.

Nodal Outgrowth of Cytotrophoblasts

Figure 4A:
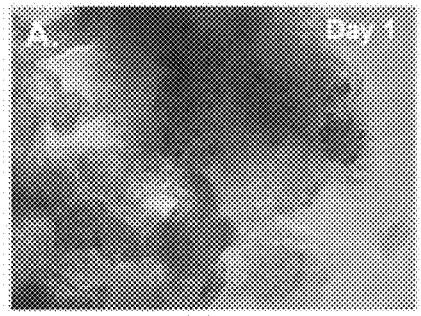
FIG. 4A shows placental nodes/cotyledons 24 hours after excision and dissection cultivated in trophoblast media.
Figure 4B:
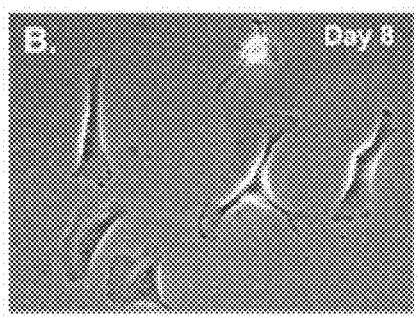
FIG. 4B shows villous cell outgrowth and early colony formation 8 days post-cultivation.
Figure 4C:
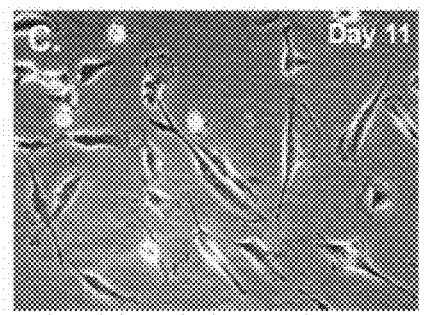
FIG. 4C shows villous cell outgrowth and subconfluent colony formation 11 days post-cultivation.
Figure 4D:
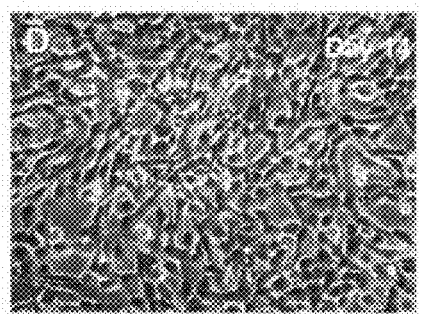
FIG. 4D shows villous cell outgrowth and confluent focal monolayers 14 days post-cultivation with yellow-dotted outlined areas designated for clonal selection and expansion.
Figure 4E:
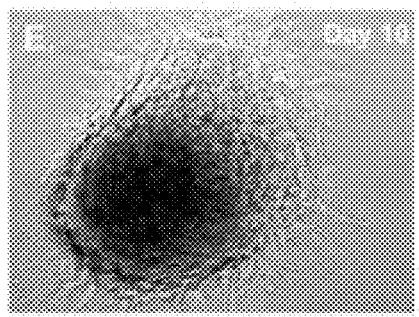
FIG. 4E shows villous tissue aggregates in culture at 10 post-cultivation.
Figure 4F:
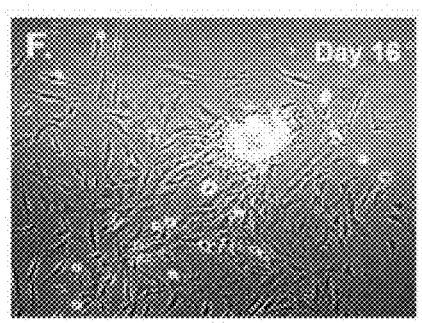
FIG. 4F shows villous tissue aggregates and associated villous cell outgrowth 16 days post-cultivation.
Figure 4G:
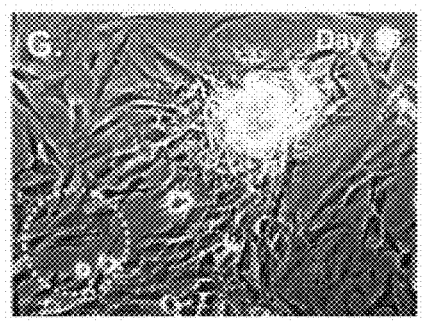
FIG. 4G shows higher magnification of villous tissue aggregates and associated villous cell outgrowth 16 days post-cultivation with yellow dotted outlined areas designated for clonal selection and expansion.

FIGS. 4A-4I show trophoblast isolation from at-term placenta villous explants after trypsinization over the course of 16 days and post sub-cultivation. On day 1, explants appeared aggregated, and some were adherent (FIG. 4A). At 8 days post-cultivation, small colonies of cells with characteristic trophoblast morphology were observed (FIG. 4B). On day 11, a significant expansion of these colonies that remained subconfluent was observed (FIG. 4C). After 14 days, patches of confluent growth with trophoblast morphology were observed (FIG. 4D). These cells were round or oval, or was multipolar, elongated cell monolayer previously described as "crazy pavement" (Pennington K A et al. *J. Vis. Exp.* (59), e3202, doi:10.3791/3202 (2012); Kolokol'tsova T D et al. *Bull Exp Biol Med.* 2015 February; 158 (4):532-6; Aboagye-Mathiesen G et al. *Clin Diagn Lab Immunol.* 1996 January; 3(1):14-22; Li L et al. *Reprod Biol Endocrinol.* 2015 Jul. 9; 13:71). In addition, it was observed what appeared as trophoblasts aggregates 10 days post-cultivation (FIG. 4E). At day 16, significant cell outgrowth from these villous trophoblasts aggregates was observed (FIG. 4F). These cells had features consistent with villous trophoblasts.

Selective Capture and Subculture of Purified Cytotrophoblast Populations

Nodal outgrowth of satellite cells that developed into confluent mini-colonies, which became subconfluent over time (FIG. 4D), and cell outgrowth obtained from nodal aggregates (FIGS. 4F and 4G) were preferred for selective capture and subculture. These colonies appeared more homogenous and had morphological characteristics and growth rates consistent with trophoblasts monolayers.

Validation of Trophoblast Isolation

Figure 4H:
FIG. 4H sows the subculture and cultivation of clonally selected cells that stain positive for cytokeratin 7 by immunofluorescent staining after 24 hours.
Figure 4I:
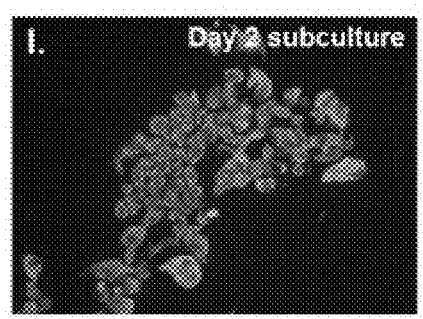
FIG. 4I shows the subculture and cultivation of clonally selected cells that stain positive for cytokeratin 7 by immunofluorescent staining after 48 hours. For immunostained images, nuclei were stained blue with 4',6-diamidino-2-phenylindole (DAPI). All images were obtained using a Nikon TE2000S microscope mounted with a charge-coupled device (CCD) camera at ×200 magnification.
Figure 5A:
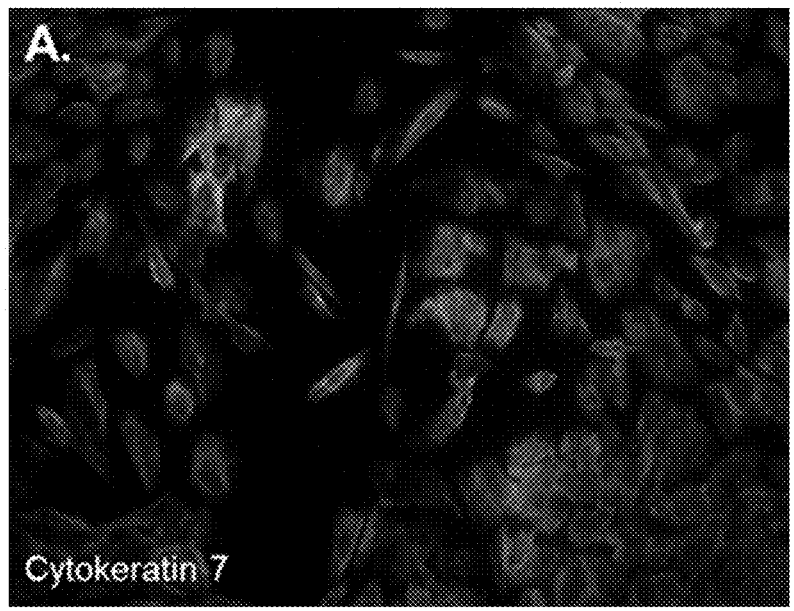
FIGS. 5A-5D show cells stained by immunofluorescent staining with antibodies against cytokeratin 7. Nuclei were stained blue with 4',6-diamidino-2-phenylindole (DAPI). All images were obtained using a Nikon TE2000S microscope mounted with a charge-coupled device (CCD) camera at ×200 magnification.
Figure 5B:
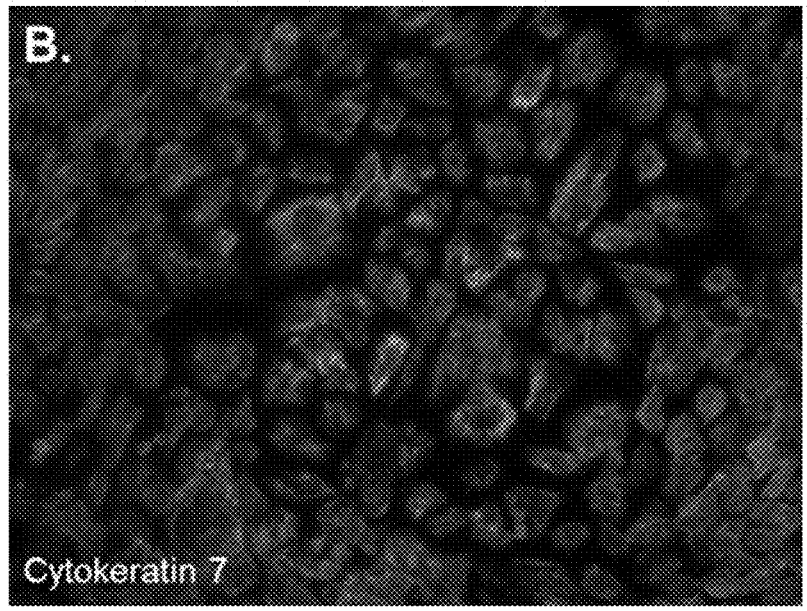
Figure 5C:
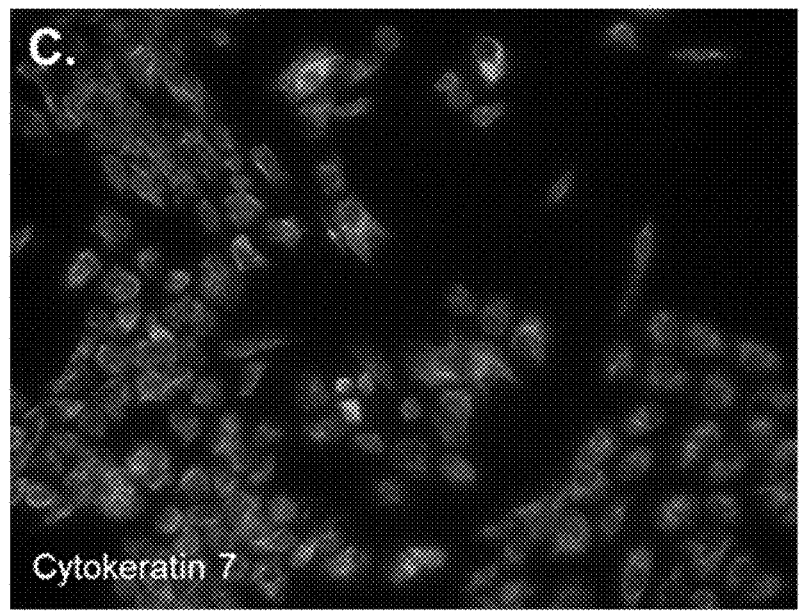
Figure 5D:
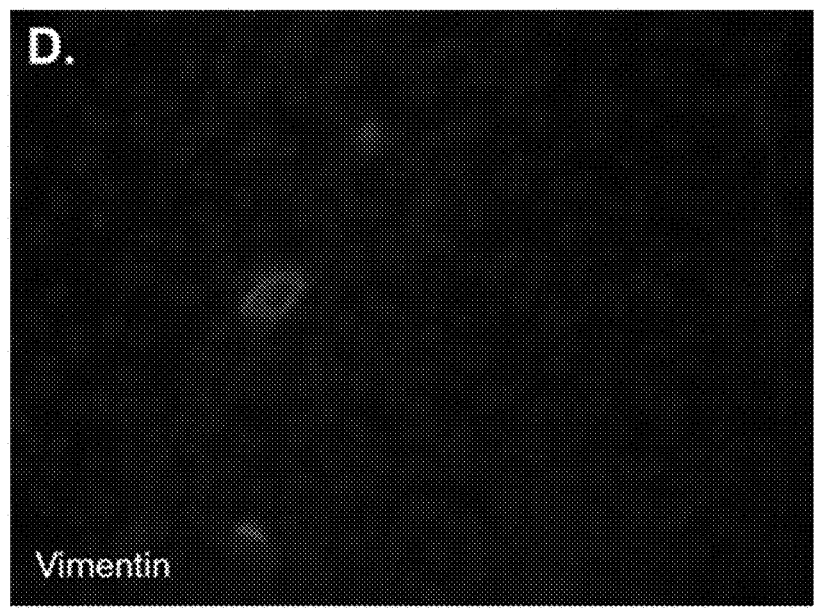
Figure 6A:
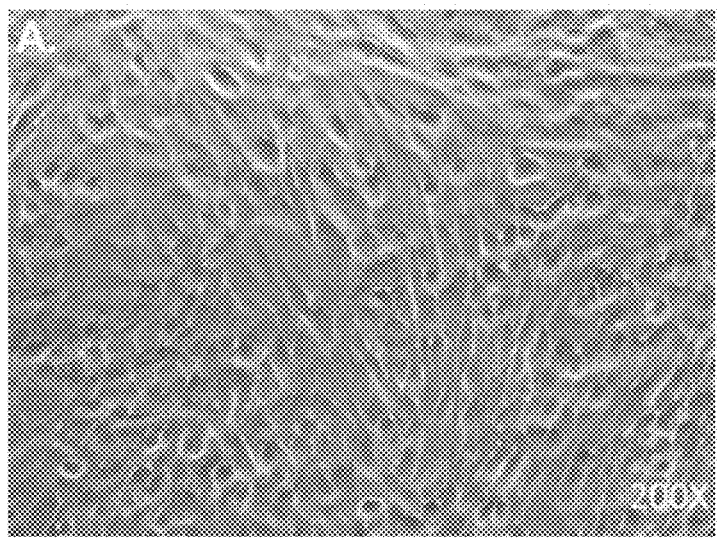
FIGS. 6A-6D show that cells treated forskolin had higher levels of hCG as determined by IHC staining.
Figure 6B:
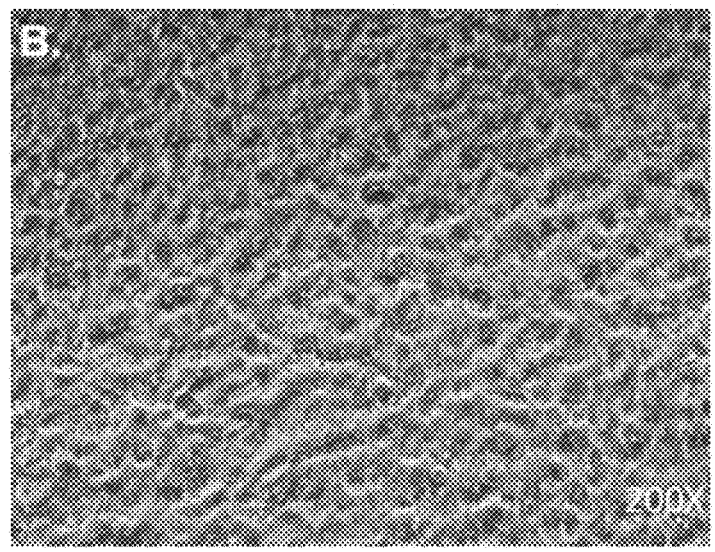
Figure 6C:
Figure 6D:
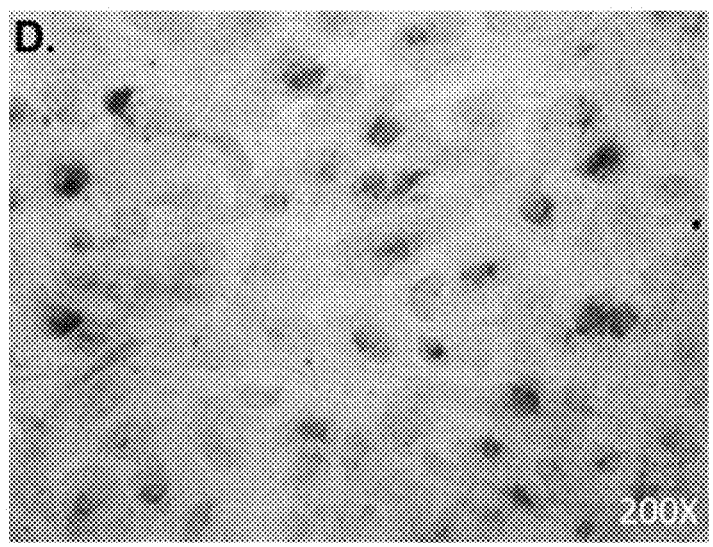

After 48 hours, the observed subcultured, subconfluent cell populations were viable, adherent, and stained positive for the trophoblast antigenic biomarker cytokeratin 7 (FIGS. 4H and 4I).

FIGS. 5A-5D show the immunofluorescent staining of purified trophoblasts expressing cytokeratin-7. As shown in FIGS. 5A-5D, after cells became confluent, universal cytokeratin 7 staining of purified cytotrophoblasts was observed by fluorescent microscopy. Primary trophoblasts were cultivated in chamber slides at a density of $1 \times 10^4$ cells/well in trophoblasts media with and without forskalin for 72 hours.

FIGS. 6A-6D show that cells treated with forskolin had higher levels of hCG as determined by IHC staining.

D. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

I claim:

1. A method for isolating and identifying a trophoblast cell, comprising:
   harvesting a placental villous tissue explant from a detached normal placenta;
   culturing the placental villous tissue explant in a culture medium under conditions suitable for proliferation of trophoblasts, wherein the culture medium comprises fetal bovine serum (FBS) and penicillin-streptomycin;
   cutting a tip and bulb portion off of a plastic pipette to expose a barrel portion of the pipette, wherein the barrel portion of the pipette has a first open end and a second open end;
   isolating, with the barrel portion of the pipette, the trophoblast cell by coating the first open end of the barrel portion with a lubricant, the lubricant selected from the group consisting of petroleum jelly, mineral oil, grease, and combinations thereof;
   placing the coated first open end of the barrel portion over the trophoblast cell to form an isolated trophoblast cell;
   treating the isolated trophoblast cell with forskolin; and
   staining the forskolin-treated trophoblast cell with an antibody to human chorionic gonadotropin (HCG) to verify identity.

2. The method of claim 1, wherein the harvesting step further comprises:
   obtaining a detached normal placenta;
   collecting placental cotyledons from the detached normal placenta; and
   extracting placental villous tissue explants from the placental cotyledons.

3. The method of claim 1, further comprising treating the isolated trophoblast cell with an enzyme solution comprising trypsin.

4. The method of claim 1, wherein the placental villous tissue explant is cultured in about 5 mL to about 30 mL of culture medium.

5. The method of claim 1, wherein the placental villous tissue explant is cultured in about 10 mL of culture medium.

6. The method of claim 1, wherein the culturing step further comprises incubating the placental villous tissue explant in the culture medium for about 1 day to about 16 days.

7. The method of claim 1, wherein the culturing step further comprises incubating the placental villous tissue explant in the culture medium for about 16 days.

8. The method of claim 1, further comprising staining the isolated trophoblast cells with cytokeratin 7 to verify identity and purity.

9. The method of claim 1, wherein the lubricant is petroleum jelly.

10. The method of claim 1, wherein the barrel portion is sterile.

11. A method for isolating and identifying a colony of trophoblast cells from placental tissue, comprising:
    obtaining a detached normal placenta;
    collecting a placental cotyledon from the detached normal placenta;
    harvesting a placental villous tissue explant from the placental cotyledon;
    culturing the placental villous tissue explant in a culture medium under conditions suitable for proliferation of trophoblasts, wherein the culture medium comprises fetal bovine serum (FBS) and penicillin-streptomycin;

cutting a tip and bulb portion off of a plastic pipette to expose a barrel portion of the pipette, wherein the barrel portion of the pipette has a first open end and a second open end;

isolating, with the barrel portion of the pipette, a colony of trophoblast cells by coating the first open end of the barrel portion with a lubricant, the lubricant selected from the group consisting of petroleum jelly, mineral oil, grease, and combinations thereof, and placing the coated first open end of the barrel portion over the colony of trophoblast cells to form an isolated colony;

treating the isolated colony of trophoblast cells with forskolin; and staining the forskolin-treated trophoblast cells with an antibody to human chorionic gonadotropin (hCG) to verify identity.

12. The method of claim 11, wherein the harvesting step further comprises sectioning the placental villous tissue explant into pieces.

13. The method of claim 11, further comprising treating the isolated colony of trophoblast cells with an enzyme solution comprising 0.05 percent trypsin-EDTA.

14. The method of claim 13, wherein the isolated colony of trophoblast cells is treated with the enzyme solution by adding the enzyme solution through the second open end of the barrel portion.

15. The method of claim 11, further comprising removing the culture medium prior to the placing step.

* * * * *